(12) United States Patent
Martin

(10) Patent No.: US 7,847,745 B2
(45) Date of Patent: Dec. 7, 2010

(54) WINDSHIELD ANTENNA AND/OR VEHICLE INCORPORATING THE SAME

(75) Inventor: Danny Martin, Arlon (BE)

(73) Assignee: Centre Luxembourgeois de Recherches pour le Verre et la Ceramique S.A. (C.R.V.C.), Grand Duche de Luxembourg ( * ) Notice: Subject to any disclaimer, the term of this patent is extended or adjusted under 35 U.S.C. 154(b) by 0 days.

(21) Appl. No.: 11/984,663

(22) Filed: Nov. 20, 2007

(65) Prior Publication Data

US 2009/0128431 A1   May 21, 2009

(51) Int. Cl.
*H01Q 1/32*   (2006.01)

(52) U.S. Cl. ........................... 343/713; 343/711

(58) Field of Classification Search ......... 343/711–715, 343/704, 701; 219/203
See application file for complete search history.

(56) References Cited

U.S. PATENT DOCUMENTS

| | | | | |
|---|---|---|---|---|
| 3,484,584 A | * | 12/1969 | Hugh, Jr. ................... | 219/522 |
| 3,549,785 A | * | 12/1970 | Timko, Jr. et al. ........... | 174/251 |
| 3,599,214 A | * | 8/1971 | Altmayer .................... | 343/713 |
| 3,601,583 A | | 8/1971 | Fujiwara | |
| 3,638,225 A | * | 1/1972 | Zawodniak ................. | 343/713 |
| 3,680,132 A | * | 7/1972 | Tolliver ...................... | 343/713 |
| 3,866,232 A | * | 2/1975 | Weigt ......................... | 343/713 |
| 3,928,748 A | | 12/1975 | Sauer | |
| 4,703,328 A | * | 10/1987 | Jones et al. ................. | 343/704 |
| 5,355,144 A | * | 10/1994 | Walton et al. ............... | 343/713 |
| 5,670,966 A | * | 9/1997 | Dishart et al. ............... | 343/713 |
| 5,792,298 A | | 8/1998 | Sauer et al. | |
| 5,898,408 A | * | 4/1999 | Du .............................. | 343/715 |
| 5,999,134 A | * | 12/1999 | Dishart et al. ............... | 343/713 |
| 6,211,831 B1 | * | 4/2001 | Nagy et al. .................. | 343/713 |
| 6,300,912 B1 | * | 10/2001 | Pla .............................. | 343/713 |
| 6,870,134 B2 | * | 3/2005 | Sol et al. ..................... | 219/203 |
| 7,202,827 B2 | * | 4/2007 | Donald ........................ | 343/715 |
| 2003/0034926 A1 | | 2/2003 | Veerasamy | |
| 2007/0029299 A1 | | 2/2007 | Prone et al. | |

FOREIGN PATENT DOCUMENTS

| | | |
|---|---|---|
| DE | 9411516 | 9/1994 |
| EP | 1653554 | 5/2006 |
| FR | 958703 | 3/1950 |

OTHER PUBLICATIONS

International Search Report dated Feb. 27, 2009.

* cited by examiner

*Primary Examiner*—Vibol Tan
*Assistant Examiner*—Crystal L Hammond
(74) *Attorney, Agent, or Firm*—Nixon & Vanderhye P.C.

(57) ABSTRACT

Certain example embodiments of this invention relate to an antenna wire embedded in a windshield, and/or vehicle incorporating the same. In certain example embodiments, an antenna wire may be embedded in an interlayer (e.g., a PVB interlayer) that is surrounded by two substrates (e.g., glass substrates). The antenna wire includes a fixed end electrically connected to a component (e.g., a bus bar) and a free end mechanically held in the interlayer via an adhesive (e.g., an adhesive tape). Thus, it may be possible to reduce distortion of the antenna wire and/or cause the antenna wire to be disposed in a manner that more closely conforms to a predetermined pattern. In certain example embodiments, the adhesive may be located at a non-visible portion of the windshield. In certain other example embodiments, the adhesive may be located at a visible portion of the windshield, and it optionally may be substantially transparent and/or provided in an aesthetically pleasing fashion.

22 Claims, 5 Drawing Sheets

WINDSHIELD ANTENNA AND/OR VEHICLE INCORPORATING THE SAME

FIELD OF THE INVENTION

Certain example embodiments of this invention relate to an antenna wire embedded in a windshield, and/or vehicle incorporating the same. In certain example embodiments, an antenna wire may be embedded in an interlayer (e.g., a PVB or other polymer-based interlayer) that is sandwiched between at least two substrates (e.g., glass substrates). The antenna wire may include a fixed end electrically connected to a component (e.g., a bus bar) and a free end mechanically held in the interlayer via an adhesive (e.g., an adhesive tape). Advantageously, it is possible to reduce distortion of the antenna wire and/or cause the antenna wire to be disposed in a manner that more closely conforms to a predetermined pattern.

BACKGROUND AND SUMMARY OF EXAMPLE EMBODIMENTS OF THE INVENTION

Generally speaking, antennas radiate and/or receive electromagnetic signals. Antenna design often involves a balancing of parameters, such as, for example, antenna size, antenna gain, bandwidth, and efficiency. Mounting antennas on the exteriors of vehicles is well-known.

An emerging trend involves including antennas (e.g., FM antennas) in the laminated front windshield of a vehicle. Such antennas typically include an electrical wire (e.g., a copper wire, about 80 microns in diameter, or other suitable diameter), which may be embedded in a polymer interlayer (e.g., a polyvinyl butyral (PVB) layer) of the front windshield.

Similar to the techniques used for creating heatable windows, if the wire is to be used for an antenna function, rather than connecting both ends of a wire to the respective bus bars, one end of the wire typically is left free in order to capture an electromagnetic field while serving in its antenna function. The antenna wire is laid out in a particular pattern or at a specific location, with certain tensions being applied thereto, for example, to ensure that it is not visible, only partially visible, or visible in an aesthetically pleasing manner. The tensions also help dispose the wire in a particular pattern (e.g., a straight line generally parallel to an exterior edge of the windshield, etc.). The fixed end of the antenna wire may be fixed to (e.g., soldered to or otherwise electrically connected with) a bus bar. Moreover, the antenna wire itself (e.g., at or proximate to the fixed end thereof) and/or bus bar may be operably connected to a transceiver unit (which may, in turn, be connected to, for example, a radio of the car, a power source such as the battery, etc.) so that the radio within the car is operable.

Unfortunately, embedding antennas in windshields in this and/or a similar manners leads to certain disadvantages. A number of heat treatments are included in the process for making windows in general (e.g., during autoclaving), and in making windshields with antennas in particular. At these high temperatures, the PVB typically used in the laminate becomes much more soft, liquefying to some extent, and sometimes even coming close to being rendered a liquid. During these steps, the antenna wire, which has a free end (the end not soldered to, for example, the bus bar), potentially may move. Also, in addition to or apart from the heat-related steps, mechanical forces and/or tensions are introduced during window manufacturing (including, for example, during rolling, unrolling, application of the PVB, etc.) and some or all of the tensions intended to be applied to the wire may be released. Thus, the likelihood of the antenna wire moving from its precise layout is increased yet further.

The most common distortion is a wave shape, as shown in FIGS. 1-2. In more detail, in FIGS. 1-2, a first glass substrate 2 and a second glass substrate 4 are provided. Initially, these glass substrates 2 and 4 are flat. A heatable coating and/or a low-E coating optionally may be deposited between the glass substrates 2 and 4 via sputtering or the like. The heatable coating may be substantially transparent to visible light and may include a transparent conductive layer of a material such as indium-tin-oxide (ITO) or silver (Ag) or may be a multi-layer coating including one or more conductive layers of ITO, Ag, or the like, that may be separated from one another by dielectric layer(s).

One or more conductive bus bars 9 is/are deposited on the substrate 4. The bus bars 9 may be applied in any suitable manner, and may be provided in any suitable location on the substrate (and over the heatable coating when such a coating is provided). For example, the bus bars 9 may be provided generally at the top and bottom or left and right of the windshield.

After the bus bars have been formed on the substrate 4, the glass substrate 4 and bus bar 9 thereon may be heat treated (e.g., thermally tempered, heat bent, and/or heat strengthened). This heat treatment typically is at temperatures of at least 500 degrees C., and more preferably at least about 600 degrees C. During this heat treatment, in example windshield applications, the glass substrate 4 and bus bars thereon may be bent to the desired curved shape for the desired windshield application. When a heatable coating is optionally used, the bus bars 9 may be in electrical contact with at least one conductive and heatable layer of the heatable coating.

A polymer inclusive laminating interlayer 5 of or including polyvinyl butyral (PVB) or any other suitable polymer-based laminating material is provided so as to laminate glass substrates 2 and 4 to one another as shown in FIG. 1. In the laminating process, which typically involves autoclaving, the two glass substrates 2, 4 with interlayer 5 therebetween are heated to typical laminating temperature(s) to laminate the glass substrates to one another thereby finalizing the electrical connections between the bus bars and external connectors, and also forming the vehicle windshield or other laminated window product.

A single antenna wire 21 is shown within the visible portion of the windshield. The fixed end 17 of the antenna wire 21 is electrically connected to (e.g., soldered to) a bus bar 9 at electrical connection area 15, while the free end 19 at least initially floats, e.g., on/within the PVB layer. Although the antenna wire 21 is laid out using a well-defined pattern (in the case of FIG. 2, a straight line generally parallel to the top edge of the windshield and generally perpendicular to the bus bar 9), after pressures are introduced, the wire is bent and/or distorted at areas 23. Yet, whether the antenna wire will become distorted and the extent of any such distortion(s) often is unpredictable.

The end-customer typically does not accept these distortions or even specify an acceptable tolerance (e.g., does not include a requirement in any technical specification for the amount of distortion allowed). Consequently, a significant number of windows are lost in the production flow. The issue is known to and recognized as problem for window suppliers, automobile manufacturers, wire suppliers, and machine makers.

Thus, it will be appreciated that there is a need in the art to overcome one or more of these and/or other disadvantages. It also will be appreciated that there is a need in the art for techniques for providing better performing antenna wires in vehicle windshields.

One aspect of certain example embodiments of this invention relates to an antenna wire provided in an interlayer of a windshield.

Another aspect of certain example embodiments relates to an antenna wire including a fixed end and a free end, with the fixed end being electrically connected to a component of the windshield or vehicle (e.g., a bus bar, radio transceiver, etc.), and with the free end being mechanically connected to interlayer (e.g., via an adhesive).

Still another aspect of certain example embodiments relates to a visible mechanical connection of the free end of an antenna wire to an interlayer of a windshield that also serves as a decorative component of the windshield.

Still another aspect of certain example embodiments relates to a reduction in distortions of antenna wires embedded in windshields and/or an increase in the ability to cause antenna wires embedded in windshields to more closely respect the patterns in which they are arranged or disposed throughout the windshield manufacturing process.

In certain example embodiments of this invention, a vehicle windshield is provided. First and second substrates are laminated to one another via at least a polymer inclusive interlayer. At least one conductive bus bar is provided between the first and second substrates. At least one antenna wire including a fixed end and a free end are provided, with the fixed end and the free end being disposed at opposing ends of the antenna wire. The at least one antenna wire is electrically connected to the bus bar at the fixed end of said at least one antenna, and the at least one antenna wire is mechanically connected to the interlayer at the free end of said at least one antenna via an adhesive.

In certain example embodiments, a vehicle windshield is provided. First and second glass substrates are laminated to one another via at least a polymer inclusive interlayer. Two conductive bus bars provided between the first and second substrates are arranged substantially linearly proximate to a first edge of the windshield. Two parallel spaced apart antenna wires are substantially perpendicular to the two bus bars, with each said antenna wire including a fixed end and a free end, and with the fixed ends and the free ends being disposed at opposing ends of the respective antenna wires. An enamel layer is disposed around at least a part of a periphery of the windshield. Each said antenna wire is electrically connected at the fixed end thereof to one said bus bar, and each said antenna wire is mechanically connected at the free end thereof to the interlayer via an adhesive tape, the adhesive tape being located behind the enamel.

According to certain example embodiments, a method of making a vehicle windshield is provided. First and second glass substrates are laminated to one another via at least a polymer inclusive interlayer. At least one conductive bus bar is provided between the first and second substrates. At least one antenna wire is provided in the interlayer in a predetermined pattern and/or at a predetermined location with respect to the windshield. The at least one antenna wire is electrically connected at a fixed end thereof to the at least one bus bar. The at least one antenna wire is mechanically connected at a free end thereof to the interlayer via an adhesive so as to reduce distortion of the at least one antenna wire during heat treatment of the windshield or a windshield component and/or during application of pressure to the windshield or a windshield component.

According to certain example embodiments, a vehicle is provided. The vehicle includes a vehicle windshield. First and second substrates are laminated to one another via at least a polymer inclusive interlayer. At least one conductive bus bar is provided between the first and second substrates. At least one antenna wire including a fixed end and a free end are provided, with the fixed end and the free end being disposed at opposing ends of the antenna wire. The at least one antenna wire is electrically connected to the bus bar at the fixed end of said at least one antenna, and the at least one antenna wire is mechanically connected to the interlayer at the free end of said at least one antenna via an adhesive.

It will be appreciated that the various aspects, features, and example embodiments disclosed herein may be used in various combinations to achieve yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
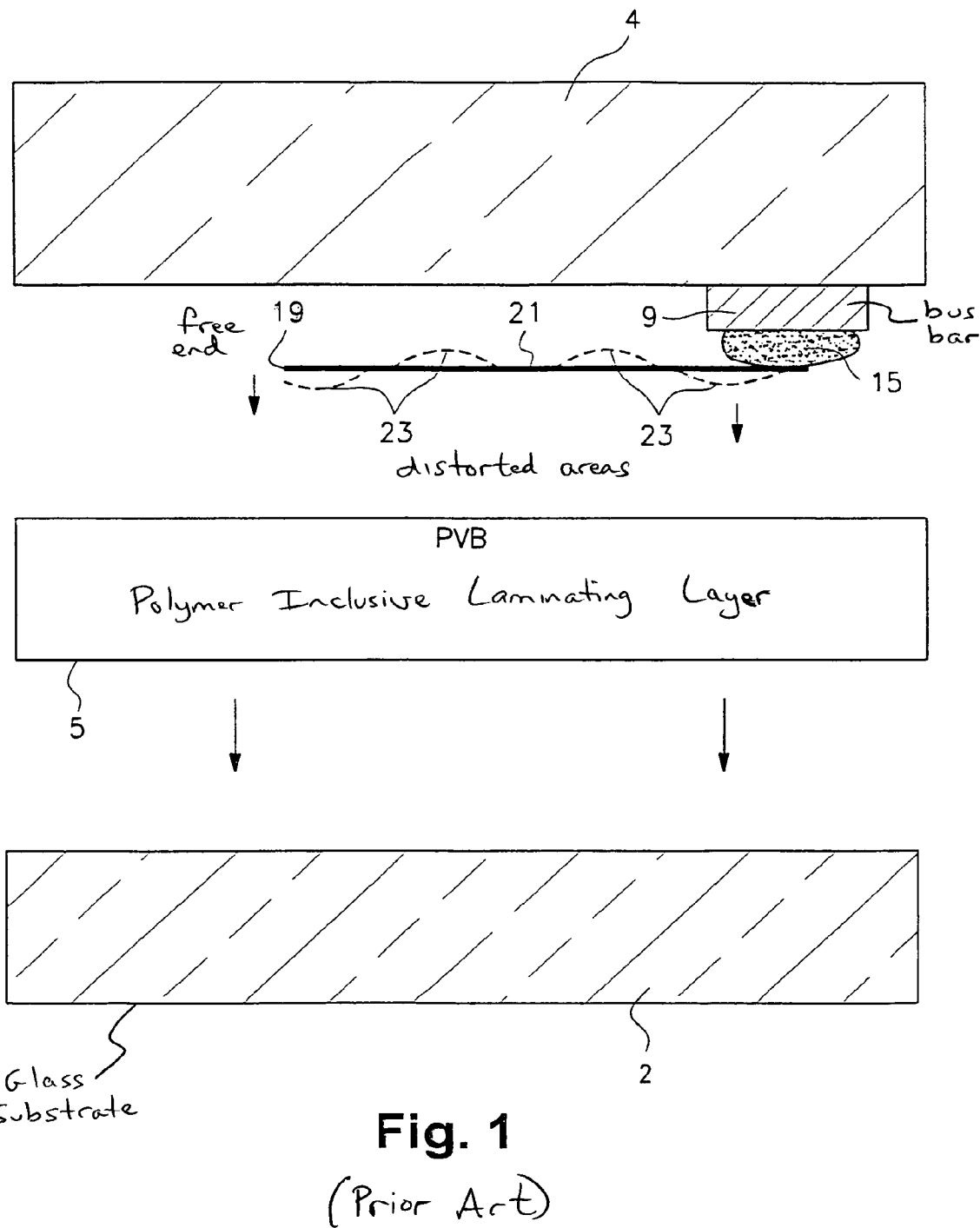
FIG. 1 is an exploded cross-sectional view of a windshield including a distorted antenna wire.
Figure 2:
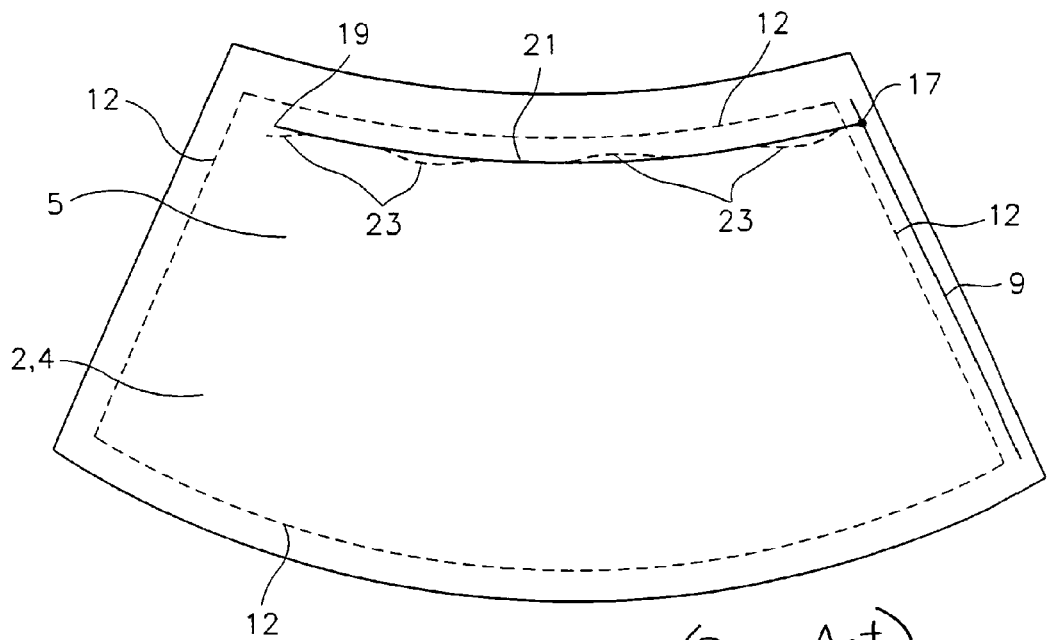
FIG. 2 is a view of a windshield including a distorted antenna wire embedded therein.

Certain example embodiments of this invention relate to a vehicle windshield including an antenna wire embedded therein. In certain example embodiments, an antenna wire may be at least partially embedded in a polymer based interlayer (e.g., a PVB interlayer) that is surrounded by or sandwiched between at least two substrates (e.g., glass substrates). The antenna wire includes a fixed end electrically connected to a component (e.g., a bus bar) and a free end mechanically held in the interlayer via an adhesive (e.g., an adhesive tape or other suitable adhesive). Thus, it may be possible to reduce distortion of the antenna wire and/or cause the antenna wire to be disposed in a manner that more closely conforms to a predetermined pattern. In certain example embodiments, the adhesive may be located at a non-visible portion of the windshield, such as at a portion hidden from view via an opaque coating provided on one of the substrates. In certain other example embodiments, the adhesive may be located at a visible portion of the windshield, and it may be substantially transparent and/or provided in an aesthetically pleasing fashion.

As described above, it often is not practical to fix both ends of the antenna wire to opposing bus bars of the windshield via electrical connections. In these and other related implementations, problems arise because electrical modifications on the free end of the antenna affect the capture of the electromagnetic field and therefore also affect the performance of the antenna, sometimes in unpredictable ways.

Certain example embodiments of this invention overcome this challenge by electrically connecting (e.g., soldering) a fixed end of the antenna wire to an electrical component (e.g., to a bus bar) and mechanically connecting the free end of the antenna wire. By way of example and without limitation, the free end of the wire may be fixed on the PVB interlayer of the windshield via mechanical means. More particularly, this may be accomplished using a suitable adhesive, such as, for example, one or more pieces of adhesive tape, glue, or the like. By way of example and without limitation, adhesive tapes commercially available from 3M or Tesa may be used (including, for example, Tesa tape numbers 4965 and 4928). In certain example embodiments, a double-sided tape may be used such that a first side of the tape adheres the wire to the PVB layer while a second side of the tape adheres the wire to a glass substrate (e.g., after the glass substrate is attached thereto during assembly), substantially holding the wire between the PVB layer and the glass substrate layer. In general, any adhesive capable of holding the wire substantially in place during the heating, rolling, unrolling, etc., steps may be used in connection with the example embodiments disclosed herein.

Double-sided adhesive tape may include protective films over one or both of the adhesive sides thereof. Thus, when the adhesive tape itself is applied to the interlayer, it may be desirable in certain example instances to remove only a first protective film. This may help protect the second adhesive side and/or reduce the amount of debris that may be caught by the exposed adhesive surface. In such cases, it is possible to remove the second protective film later during production, such as, for example, when the second substrate, an enamel, etc., is/are about to be applied The adhesive is left on the glass after manufacturing (as it is sandwiched between two or more layers) and typically is at least partially visible on the finished product. The antenna wire and adhesive may be located on various parts of the windshield, such as, for example, those parts that are not visible when the windshield is installed, e.g., in a vehicle. Also, as another example of where the antenna wire and adhesive may be located, they may be provided behind an enamel (e.g., a decorative black enamel) typically provided at the lower edge or around substantially the entire periphery of the visible portion of an installed windshield. In still other examples, the antenna wire may be extended, e.g., to a length beyond the visible portion of the windshield such that the adhesive is no longer visible, although it will be appreciated that an increased length of antenna may change the performance of the antenna while offering more options for the location of the adhesive.

In these and/or other cases, the cosmetic and/or aesthetic appearance of the adhesive may be of a reduced importance. Also, the cosmetic and/or aesthetic appearance of the adhesive may be of a reduced importance even when the adhesive is visible on the finished glass, but not visible when the windshield is installed in the vehicle.

However, when the free end of the antenna wire is located on the visible part of the glass when installed, the aesthetic and/or cosmetic appearance of the tape often is of interest, for example, to windshield suppliers, vehicle manufacturers, and end-consumers (e.g., those who purchase vehicles including the same). In certain example embodiments, it is possible to provide a substantially transparent adhesive (e.g., a substantially transparent adhesive tape). However, this is not always possible. To compensate for this potentially displeasing aesthetic and/or cosmetic appearance, the adhesive may be provided in a conspicuous manner but may be provided in a somewhat more aesthetically and/or cosmetically pleasing fashion, and/or in a way that makes it look like the adhesive is supposed to be located on the windshield. For example, the adhesive may be provided according to a certain shape, in accordance with a logo (e.g., of the windshield supplier, of the vehicle manufacturer, etc.), as a vanity feature (e.g., for custom designs, monogram, initials, etc.), or the like. Thus, the adhesive may become more like a feature or distinguished characteristic of the windshield, rather than an irremovable holdover from the manufacturing process, an aesthetically displeasing addition to the windshield, etc.

Thus, certain example embodiments advantageously may reduce distortions, such as, for example, waves, variations in patterns, etc., that appear in antenna wires. Also, certain example embodiments advantageously may help antenna wires disposed in windshields more closely match or respect the patterns in which they are arranged or disposed even throughout the manufacturing process. Still further, the number of lost products may be reduced, thereby increasing yield and decreasing overall costs while also injecting more certainty into the production process.

Figure 3A:
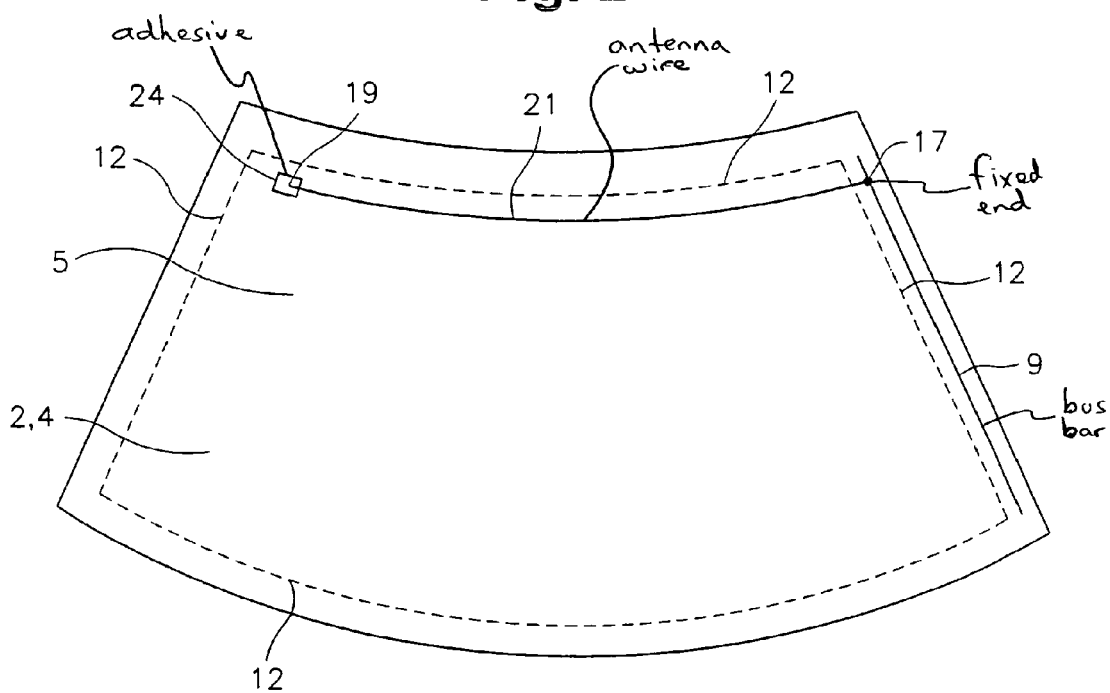
FIG. 3A is a view of an illustrative windshield including an antenna wire embedded therein in accordance with an example embodiment.

FIG. 3A is a view of an illustrative windshield including an antenna wire embedded therein in accordance with an example embodiment. The antenna wire may be provided for allowing radio signals or the like to be received by a component (e.g., radio, GPS, phone, or the like) of the vehicle. As can be seen from FIG. 3A, the antenna wire 21 has two ends. A fixed end 17 is operably connected to a stationary element in or proximate to the windshield. For example, the fixed end 17 may be operably connected to a bus bar, to a connection element electrically connected to a bus bar, to a radio transceiver, etc. The electrical connection may be a solder connection in certain example embodiments. A free end 19 of the antenna wire 21 is held in place by an adhesive 24. By way of example and without limitation, the adhesive 24 may be an adhesive tape, glue, or the like. As shown in FIG. 3A, the antenna wire 21 is located at least partially on the visible area of the windshield. Thus, it may be desirable to use a substantially transparent adhesive 24 to secure the free end 19 of the antenna wire 21.

Although not shown in FIG. 3A, the antenna wire 21 may extend beyond the visible portion of the windshield (e.g., beyond the deleted portion 12). In such embodiments, the need for a substantially transparent adhesive 24 may be reduced, as the adhesive may be at least partially concealed once the windshield is installed, e.g., in a vehicle.

Figure 3B:
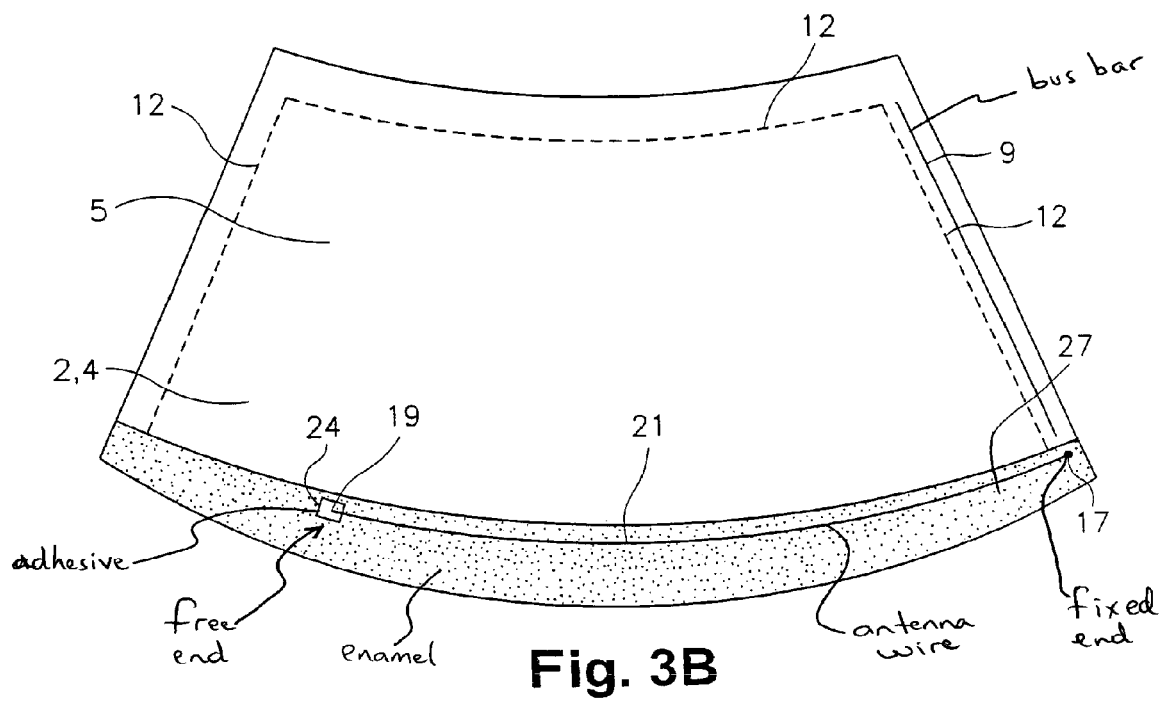
FIG. 3B is a view of another illustrative windshield including an antenna wire embedded therein in accordance with an example embodiment.

FIG. 3B is a view of another illustrative windshield including an antenna wire embedded therein in accordance with an example embodiment. In FIG. 3B, the antenna wire 21 and/or the adhesive 24 is/are located "behind" an at least partially opaque enamel layer 27 provided on one or more of the laminates. That is, an enamel layer 27 may at least partially conceal the appearance of the antenna wire 21 and/or the adhesive 24. Thus, in these embodiments, the need for a substantially transparent adhesive 24 again may be reduced, as the adhesive and/or the antenna wire will be at least partially concealed by the enamel layer 27.

Figure 3C:
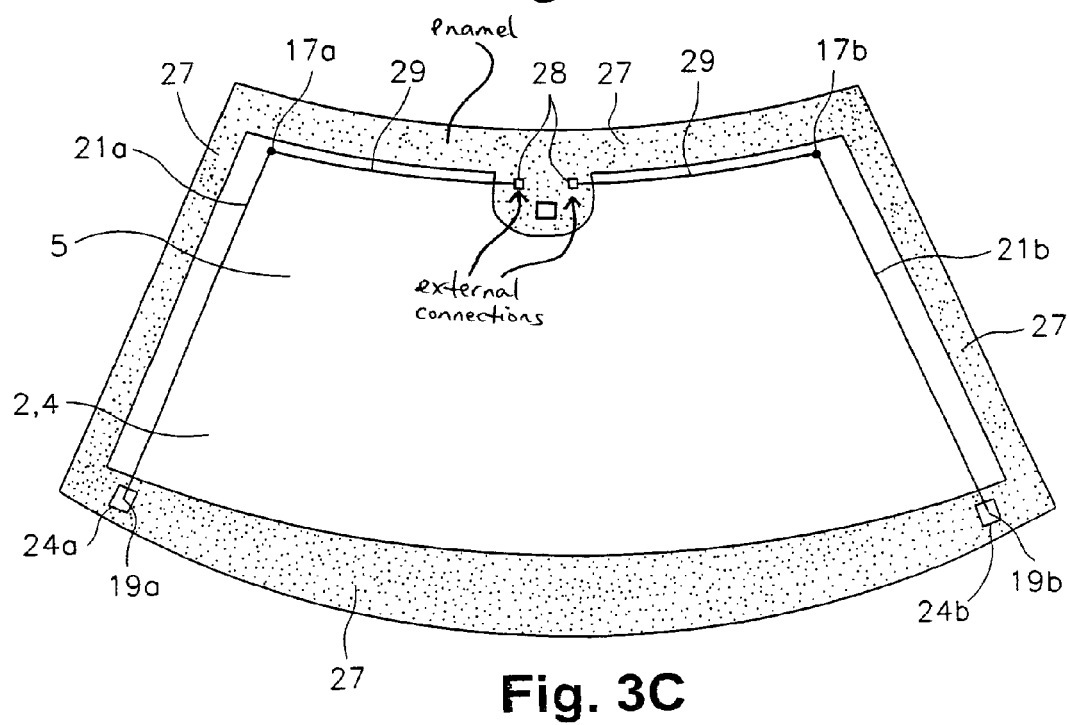
FIG. 3C is a view of still another illustrative windshield including an antenna wire embedded therein in accordance with an example embodiment.

FIG. 3C is a view of still another illustrative windshield including a pair of antenna wires embedded therein in accordance with an example embodiment. As can be seen from FIG. 3C, an enamel 27 is provided around substantially the entire periphery of the windshield. Two "mini-bus bars" 29 extend generally horizontally substantially parallel to the top edge of the windshield. Also, the two mini-bus bars 29 are arranged substantially collinear to each other. The mini-bus bars 29 have external connections 28. Two antenna wires 21*a* and 21*b* are provided, e.g., for respectively receiving AM and FM radio transmissions, or for respectively receiving radio and television signals, etc. The two antenna wires 21*a*, 21*b* are provided generally perpendicular to the mini-bus bars 29 such that they are also provided in a generally vertical manner. As shown in FIG. 3C, the mini-bus bars 29 and the antenna wires 21*a*, 21*b* are at least partially within the visible area of the windshield, although the present invention is not limited to this configuration. For example, either or both of the mini-bus bars 29 and the antenna wires 21*a*, 21*b* may be provided at least partially behind the enamel 27 so as to at least partially conceal the same.

Each of the antenna wires 21*a*, 21*b* has a fixed end 17*a*, 17*b*, which is connected to an end of the mini-bus bars 29. As shown in FIG. 3C, the antenna wires 21*a*, 21*b* extend behind the enamel 27 proximate to the bottom edge of the windshield. Also, the free ends 19*a*, 19*b* of the antenna wires 21*a*, 21*b* are respectively mechanically connected behind the enamel 27 via adhesives 24*a*, 24*b*. In FIG. 3C, the adhesives 24*a*, 24*b* are located behind the enamel 27 in their entireties. However, the present invention is not so limited. For example, as noted above, the adhesives may be on the visible portion of the windshield and thus may be located above the enamel 27, particularly when the adhesives 24*a*, 24*b* are substantially transparent. However, in certain example embodiments, the adhesives also may be provided in a manner such that they overlap the visible portion of the windshield and the enamel 27. This may be advantageous when the adhesives chosen in a particular implementation adhere better to either the enamel or substrate.

It will be appreciated that the antenna wire 21, the adhesive 24, and/or the bus bars may be provided at various locations and/or in various arrangements with respect to the windshield, in connection with and/or in addition to those examples shown in and described with reference to FIGS. 3A-3C. For example, the antenna wire 21 may be substantially horizontal or may be substantially vertical. Similarly, the antenna wire 21 may be located proximate to a top or bottom edge, and/or left or right edge of the windshield. Moreover, decorative enamels may be applied to the windshield in various places, and the antenna wire 21 and/or adhesive 24 may be at least partially concealed by such an enamel.

Figure 4:
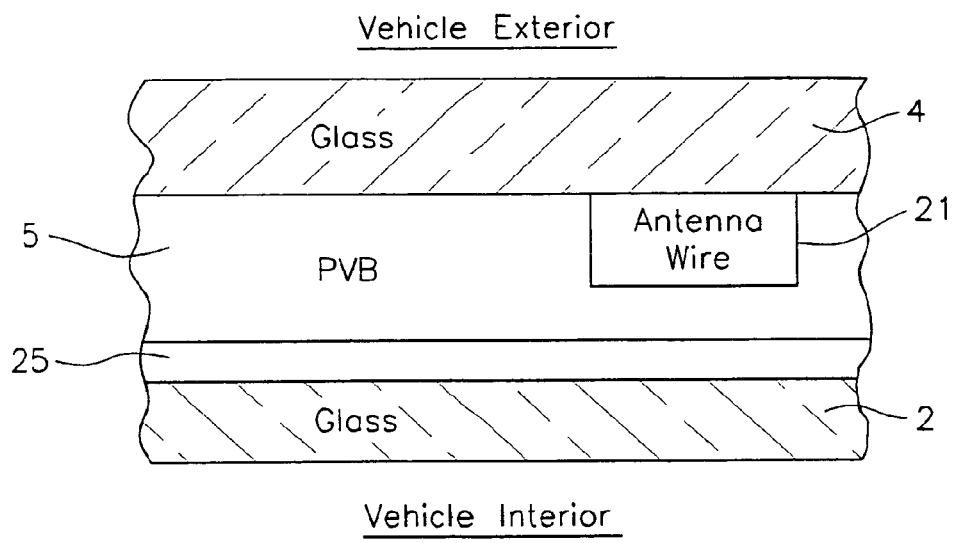
FIG. 4 is a side cross-sectional view of an illustrative windshield including an antenna wire embedded therein in accordance with an example embodiment.

FIG. 4 is a side cross-sectional view of an illustrative windshield including an antenna wire embedded therein in accordance with an example embodiment. A first substrate (e.g., a glass substrate) 2 is located proximate to a vehicle interior. A low-E coating 25 optionally is provided on the interior surface of the substrate 2 and an antenna wire 21 is provided on an interior surface of a second substrate (e.g., a glass substrate) 4 and thus embedded in an interlayer (e.g., a PVB interlayer) 5. The antenna wire 21 may be electrically connected to an electrical component (e.g., bus bar, or other electrical component not shown in FIG. 4) also provided on the substrate 4. However, it is also possible that the antenna wire 21 may extend through the interlayer 5 and be electrically connected to an electrically active layer (e.g., Ag layer) of the low-E coating 25 in certain alternative embodiments of this invention.

Figure 5:
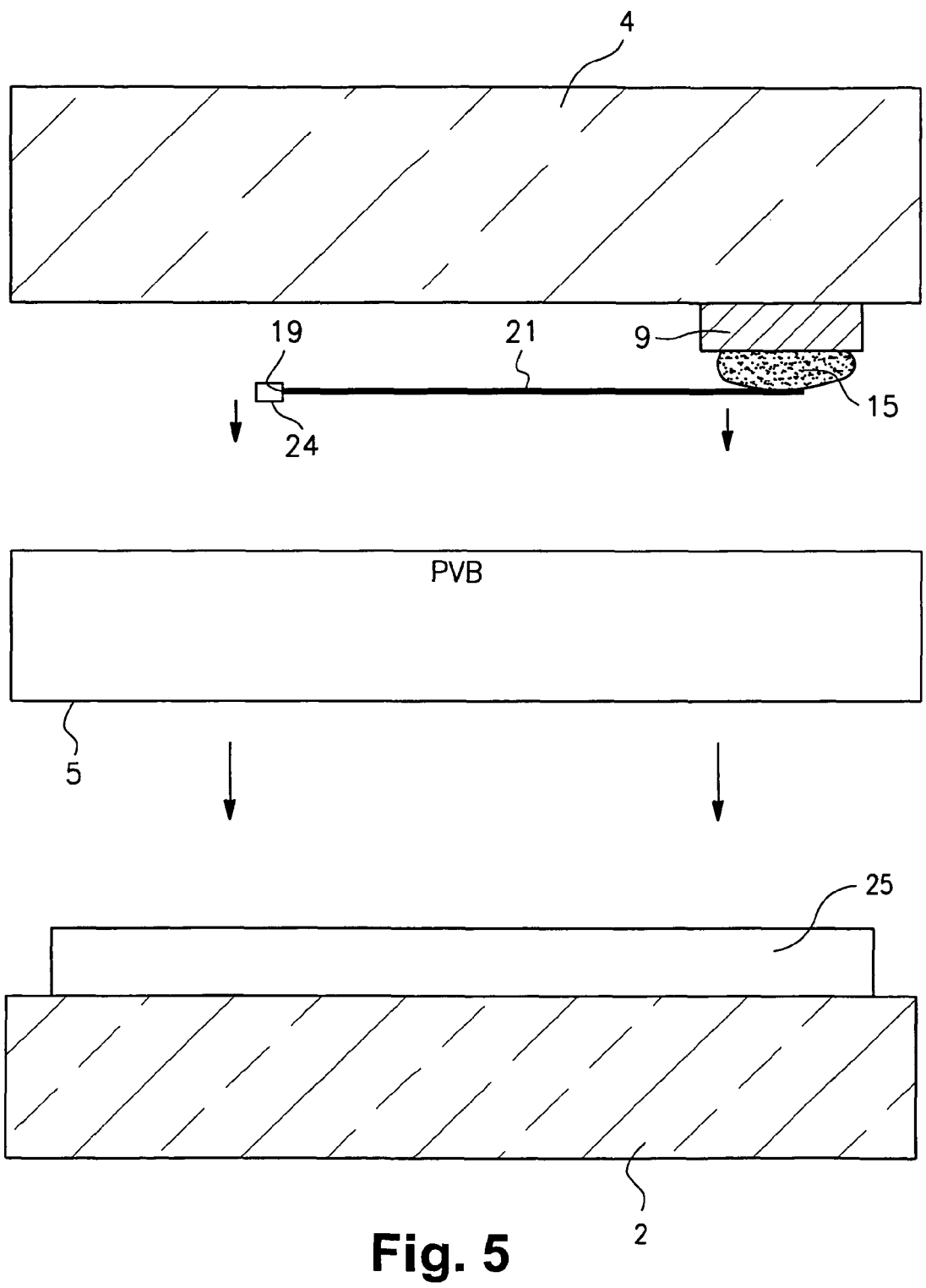
FIG. 5 is an exploded cross-sectional view of another illustrative windshield including an antenna wire embedded therein in accordance with an example embodiment; and, FIG. 6 is a vehicle having a windshield including an antenna wire embedded therein in accordance with an example embodiment.

FIG. 5 is an exploded cross-sectional view of another illustrative windshield including an antenna wire embedded therein in accordance with an example embodiment. FIG. 5 is similar to FIG. 1 in that an interlayer 5 (e.g., of or including PVB) is provided between an inner substrate 2 and an outer substrate 4. Optionally, a heatable coating 3 may be formed on the inner surface of the outer substrate 4. One or more bus bars 9 may be provided immediately over the heatable coating when such a heatable coating is provided. When a heatable coating is provided, it may be formed of ITO or the like. A low-E coating 25 optionally may be included. In certain example embodiments, the low-E coating 25 may be disposed on the interior surface of the inner substrate 4. This location of low-E coating 25 and/or the composition of the optional heatable coating may help to reduce interference with signals from and/or to the antenna wire(s). With respect to the antenna wire 21, it is electrically connected (e.g., soldered) to one bus bar and/or a electrical connection area thereof (in the case of FIG. 5, electrical connection area 15 formed on bus bar 9). The antenna wire 21 is mechanically fixed via an adhesive 24 at the free end 19 thereof. In certain example embodiments, a dual-sided adhesive tape may be fixed first to the interlayer 5 and then fixed to the optional heatable coating or the outer substrate 4 directly. In certain other example embodiments, it may be disposed behind an optional enamel coating (not shown in FIG. 5). In certain example embodiments, the antenna wire may be connected to a bus bar different from the bus bar connected to the heatable coating, whereas the same bus bar as the heatable coating may be used in certain other example embodiments.

Figure 6:
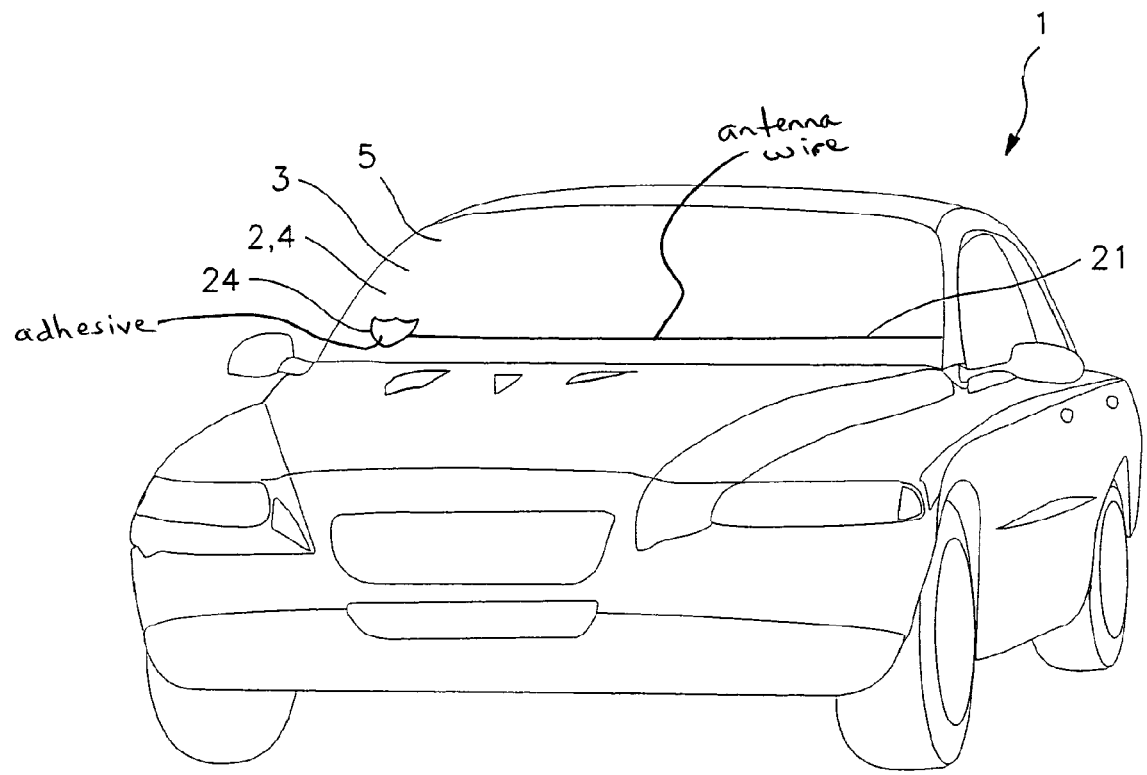

FIG. 6 is a vehicle 1 having a windshield including an antenna wire 21 embedded therein in accordance with an example embodiment. The windshield of vehicle 1 has a visible antenna wire 21 and a visible adhesive 24. Adhesive 24 is provided in an aesthetically pleasing manner, such that it resembles a shield. Of course, it will be appreciated that other shapes, sizes, logos, etc., may be used in connection with certain other example embodiments and that the present invention is not limited to any particular adhesive shape and/or placement. Thus, a variety of decorative adhesives and/or decorative adhesive tapes may be used in connection with the example embodiments described herein.

Thus, according to certain example embodiments, a method of making a vehicle windshield is provided. First and second glass substrates are laminated to one another via at least a polymer inclusive interlayer. At least one conductive bus bar is provided between the first and second substrates. At least one antenna wire is provided in the interlayer in a predetermined pattern and/or at a predetermined location with respect to the windshield. The at least one antenna wire is electrically connected at a fixed end thereof to the at least one bus bar. The at least one antenna wire is mechanically connected at a free end thereof to the interlayer via an adhesive so as to reduce distortion of the at least one antenna wire during heat treatment of the windshield or a windshield component and/or during application of pressure to the windshield or a windshield component.

It will be appreciated that the various aspects, features, and example embodiments disclosed herein may be used in various combinations to achieve yet further embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle windshield comprising:

first and second substrates laminated to one another via at least a polymer based interlayer;

at least one conductive bus bar provided between the first and second substrates; and at least one antenna wire provided at least partially between the first and second substrates, the antenna wire including a fixed end and a free end disposed at opposing ends of the antenna wire, wherein the antenna wire is electrically connected to the bus bar at the fixed end thereof, and wherein the antenna wire is mechanically attached to the polymer based interlayer at the free end thereof via an adhesive.

2. The vehicle windshield of claim 1, wherein the first and second substrates are glass substrates.

3. The vehicle windshield of claim 1, wherein the interlayer comprises polyvinyl butyral (PVB).

4. The vehicle windshield of claim 1, wherein the at least one antenna wire is electrically connected to the bus bar via soldering.

5. The vehicle windshield of claim 1, wherein the adhesive is an adhesive tape.

6. The vehicle windshield of claim 5, wherein the adhesive tape is a decorative adhesive tape.

7. The vehicle windshield of claim 1, wherein the adhesive is a substantially transparent adhesive.

8. The vehicle windshield of claim 1, wherein the adhesive is disposed on a portion of windshield such that the adhesive is visible after the windshield is installed in a vehicle.

9. The vehicle windshield of claim 1, further comprising an enamel disposed around at least a part of a periphery of the windshield.

10. The vehicle windshield of claim 9, wherein the adhesive is disposed behind the enamel so as to be hidden from view.

11. The vehicle windshield of claim 1, wherein each said antenna wire is disposed substantially parallel to a respective edge of the windshield and substantially perpendicular to at least one said bus bar.

12. The vehicle windshield of claim 1, further comprising another bus bar and at least one heatable layer in electrical communication with the bus bars, the heatable layer extending across a substantial portion of the windshield.

13. A vehicle windshield, comprising:

first and second glass substrates laminated to one another via at least a polymer inclusive interlayer;

two conductive bus bars provided between the first and second substrates;

two parallel spaced apart antenna wires substantially perpendicular to at least portions of the two bus bars, respectively, each said antenna wire including a fixed end and a free end, the fixed ends and the free ends being disposed at opposing ends of the respective antenna wires; and an enamel layer disposed around at least a part of a periphery of the windshield, wherein each said antenna wire is electrically connected at the fixed end thereof to one said bus bar, and wherein each said antenna wire is mechanically connected at the free end thereof to the interlayer via an adhesive tape, the adhesive tape being located behind the enamel so as to be hidden from view.

14. A method of making a vehicle windshield, the method comprising:

laminating first and second glass substrates to one another via at least a polymer inclusive interlayer;

providing at least one conductive bus bar between the first and second substrates;

providing at least one antenna wire in the interlayer in a predetermined pattern and/or at a predetermined location with respect to the windshield;

electrically connecting the at least one antenna wire at a fixed end thereof to the at least one bus bar; and mechanically connecting the at least one antenna wire at a free end thereof to the interlayer via an adhesive so as to reduce distortion of the at least one antenna wire during heat treatment and/or application of pressure to the windshield and/or a windshield component.

15. The method of claim 14, wherein the interlayer comprises polyvinyl butyral (PVB).

16. The method of claim 14, further comprising soldering the at least one antenna wire to the at least one bus bar.

17. The method of claim 14, wherein the adhesive tape is a decorative adhesive tape.

18. The method of claim 14, wherein the adhesive tape is substantially transparent.

19. The method of claim 14, further comprising disposing the adhesive tape on a portion of windshield such that the location of adhesive tape is visible after the windshield is installed in a vehicle.

20. The method of claim 14, further comprising providing an enamel around at least a part of a periphery of the windshield.

21. The method of claim 20, further comprising locating the adhesive tape behind the enamel.

22. The method of claim 14, further comprising providing at least one heatable layer in electrical communication with the at least one bus bar.

* * * * *